Jan. 18, 1949.  B. A. SWENNES  2,459,470
MOTOR VEHICLE FUEL TANK
Filed April 5, 1944
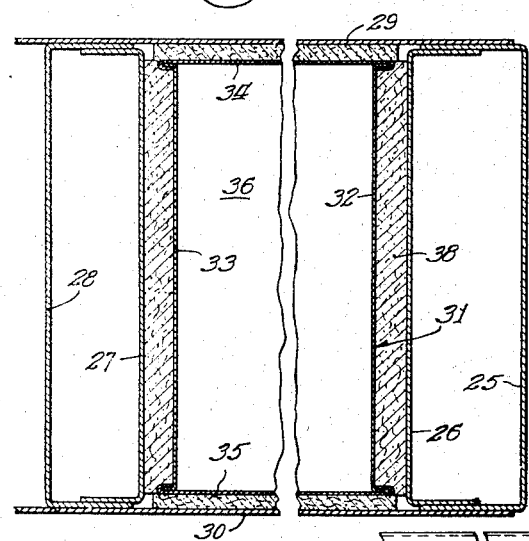
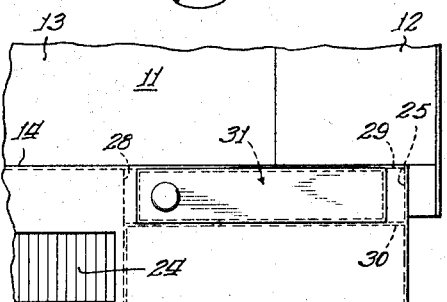
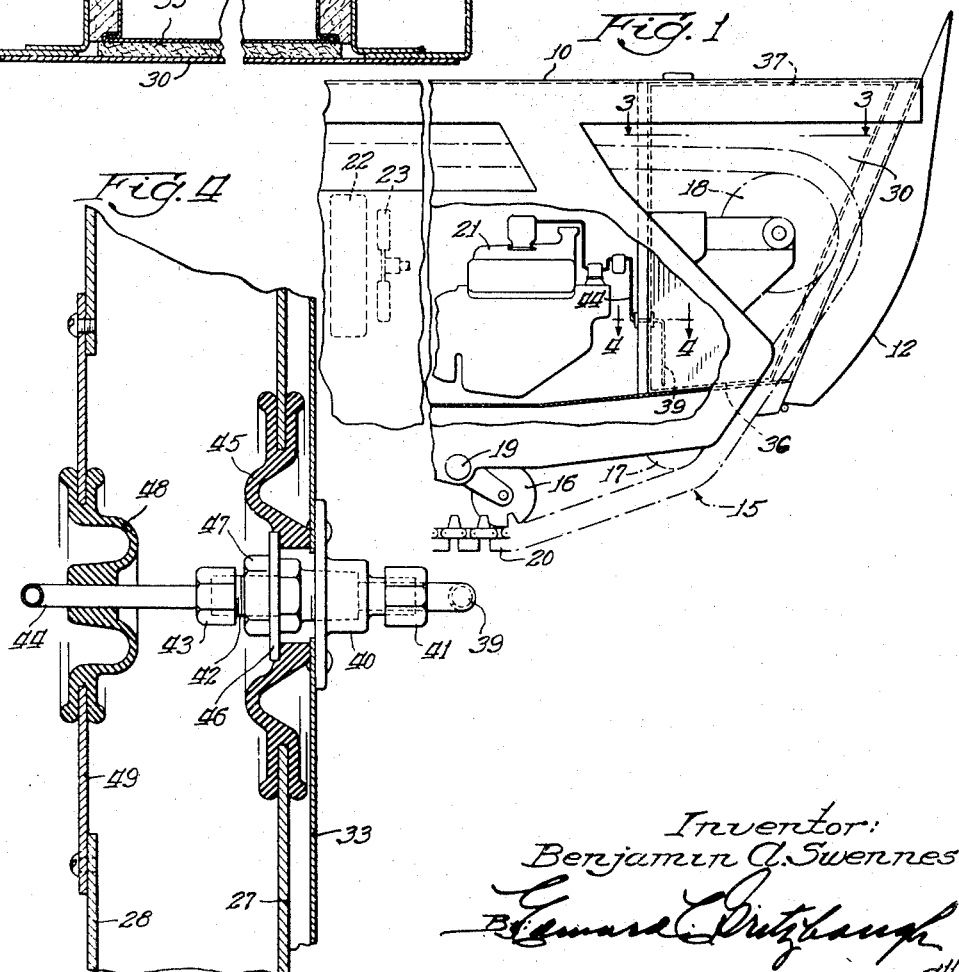
Inventor:
Benjamin A. Swennes Patented Jan. 18, 1949

2,459,470

UNITED STATES PATENT OFFICE 2,459,470

MOTOR VEHICLE FUEL TANK

Benjamin A. Swennes, Rockford, Ill., assignor, by mesne assignments, to the United States of America as represented by the Secretary of the Navy Application April 5, 1944, Serial No. 529,630

4 Claims. (Cl. 280—5)

My invention relates to motor vehicles and more particularly to motor fuel tanks in such vehicles.

In my co-pending applications, Serial No. 508,-304, filed October 30, 1943, which issued as Patent No. 2,456,542, December 14, 1948, and Serial No. 529,727, filed April 6, 1944, the latter having issued as Patent No. 2,416,728, Feb. 18, 1947, there is disclosed an amphibian vehicle having a water tight body provided with a load space therein. The load space is defined by a load deck and vehicle body sides extending upwardly from the deck. The body sides are of substantial thickness so as to constitute housings, and a motor and shafting driven thereby for driving the vehicle are disposed in each of the housings.

It is an object of the present invention to provide fuel tanks for the motors in such a vehicle so located that they will not detract from the load space in the vehicle. To this end it is an object to dispose the fuel tanks adjacent the motors at ends thereof in the sides of the vehicle body forming housings for the motors.

Due to the proximity between the motors and their fuel tanks in such a vehicle, it was found that the fuel tanks tended to become unduly heated from motor heat, particularly when a cooling fan is provided causing a draft of air across each of the motors directed toward the adjacent fuel tank as is disclosed in the latter application, and it is a further object to provide heat insulating means around the fuel tanks so that such undue heating of the fuel tanks does not occur.

In order to provide fuel tanks of great capacity, it was found expedient to provide the fuel tanks with sides extending closely adjacent and parallel with the sides of the motor housings as well as closely adjacent and parallel with certain structural reinforcing members in the housings. It is another object of my invention to provide a construction for supporting and reinforcing the sides of the fuel tanks with respect to the vehicle motor housings, and the structural members, with the supporting means being such that racking and distortion of the motor housings and structural members, occurring when the vehicle travels over rough terrain, will not unduly distort the fuel tanks. To this end it is an object to provide heat insulating means hereinbefore mentioned around the fuel tanks which is of a yieldable material and has the additional function of cushioning the fuel tanks from jarring and racking of the surrounding motor housings and structural members.

The invention consists of the novel constructions, arrangements and devices to be hereinafter described and claimed for carrying out the above stated objects and such other objects as will appear from the following description of a certain preferred embodiment illustrated in the accompanying drawing, wherein:

Fig. 1 is a partial side elevational view of an amphibian vehicle of the type disclosed in my aforesaid co-pending applications and embodying the principles of the present invention;

Fig. 2 is a partial plan view of the amphibian vehicle;

Fig. 3 is a sectional view on an enlarged scale taken on line 3—3 of Fig. 1; and Fig. 4 is a sectional view on an enlarged scale taken on line 4—4 of Fig. 1.

Like characters of reference designate like parts in the several views.

Referring now to the drawing, the illustrated vehicle is amphibious and comprises a water tight body 10 having a load space 11 therein extending longitudinally of the body and an end gate 12 hingedly mounted on the rear of the vehicle for providing access into the load space when open. The load space 11 is defined by a load deck 13 and sides 14 of the body 10 which extend upwardly from the load deck 11 on each side thereof. A pair of endless articulated tracks 15 are disposed on opposite sides of the vehicle (one side only of the vehicle being illustrated), and each of the tracks extends around and is held in looped configuration by bogie wheels 16 on the bottom of the vehicle and idler wheels 17 and 18 on the rear end of the vehicle, as well as other wheels adjacent the front end of the vehicle (not illustrated). Each of the bogie wheels 16 is preferably connected with the body 10 by means of a swinging and yielding torsion unit 19 which functions to absorb shocks imparted to the wheels 16 and which may be of any suitable construction. The articulated tracks 15 are provided with a plurality of lugs or grousers 20, and these grousers function when the vehicle is in the water and the tracks are driven to provide the necessary traction between the water and tracks to propel the vehicle through the water. It will be noted that the sides 14 of the vehicle have substantial thickness, and each of these sides forms a housing for a motor 21, and the motors in both sides of the vehicle are connected by any suitable means (not shown) for driving the tracks 15. Each of the motors has a radiator 22 in its housing, and the radiator is connected with the water cooling system of the motor in accordance with standard practice. A fan 23 is provided at the rear of each of the radiators 22 and is driven by the adjacent motor 21 for drawing air through the motor housing, through the radiator 22, over the motor 21 and out of the motor housing through any suitable air discharge 24 in the top of the vehicle side 14 for cooling the motor. For various details of the amphibian vehicle as so far described, such as details of the shape of the grousers 20, details of the driving connections between the motors 21 and the tracks 15 and details of the air ducts for cooling the motors 21, my aforesaid co-pending applications may be referred to.

A plurality of body stiffening channels 25, 26, 27 and 28 are provided extending generally upwardly in each of the vehicle sides 14. As shown in Fig. 3, the channels 25 and 26 are opposed to each other and form the rear end of the vehicle to cooperate with the gate 12. The channels 27 and 28 also are opposed to each other and are adjacent the motor 21 in the vehicle side. The channels 25, 26, 27 and 28 extend substantially between an inner sheet metal portion 29 of the vehicle side 14 and an outer sheet metal portion 30 of the vehicle side, and the channels are fixed with respect to the portions 29 and 30 by any suitable means (not shown). It will be noted that the channels 26 and 27 and the sheet metal portions 29 and 30 in effect define a well or cavity in the vehicle body 10, with the webs of the channels 26 and 27 forming opposite walls of the well and the portions 29 and 30 forming opposite walls of the well.

A fuel tank 31 is provided in the well defined by the portions 26, 27, 29 and 30, and the fuel tank has sheet metal sides 32, 33, 34 and 35, as shown in Fig. 3. The side 32 is adjacent and extends parallel to the web of the channel 26, and the sides 33, 34 and 35 similarly are adjacent and extend parallel to the sheet metal portions 27, 29 and 30, respectively. The tank has a bottom 36, and the tank bottom is adjacent and extends substantially parallel to the deck 13, as shown in Fig. 1. A similar construction is provided for the top 37 of the tank with respect to the top of a vehicle side 14. The tank 31 is supported and reinforced with respect to the deck 13 and the sheet metal side portions 26, 27, 29 and 30 as well as with respect to the top of the vehicle side 14 by means of sheets of fibre board 38 disposed between these parts and the tank.

A fuel outlet which passes through but is movable with respect to the channels 27 and 28 is provided for each of the tanks 31. The fuel outlet (see Fig. 4) comprises a metal tube 39 extending downwardly into the tank substantially to its bottom, a coupling member 40 fixed to the side 33 of the fuel tank, a coupling 41 threaded onto the coupling member 40 and fixing the tube 39 to the coupling, a coupling member 42 screwed into the coupling member 40, and a coupling 43 screwed onto the coupling member 42 and fixing a tube 44 connected with the motor 21 to the coupling member 42. An annular washer-like member 45 of rubber or a similar yielding material is disposed about the coupling member 42 and is fixed in fluid tight relation with respect to the fuel tank by means of a metal washer 46 on the coupling member 42 and a nut 47 bearing against the washer 46 and compressing the rubber member 45 between the fuel tank and washer. A similar washer-like member 48 of yielding material is disposed on the tube 44 and fits on a plate 49 which is in turn fixed on the channel 28. The washer-like members 45 and 48 effectively complete the webs of the channels 27 and 28 with respect to the outlet tube 44 to prevent the leakage of any fuel through the channels 27 and 28 or the leakage of any water into the space between the channels or into the well for the fuel tank 31; however, the members 45 and 48, being of yielding material, allow movement of the tube 44 and the fuel tank 31 relative to the channels 27 and 28.

It will be noted that the fuel tanks 31 are advantageously located in the vehicle. Being disposed in the vehicle sides 14, they do not detract from the load space 11 and occupy a space that would otherwise be vacant. The sheets of fibre board 38 about the sides, bottom and top of each of the fuel tanks 31 have a three-fold function. Firstly, the sheets of fibre board function to support the fuel tank with respect to the walls of the well in which the fuel tank is disposed. Secondly, the sheets of fibre board function to heat insulate the fuel tank. The adjacent fan 23 causes a draft of air to flow through the respective radiator 22 and over the adjacent motor 21 for cooling the motor, and since the fuel tank is located in a position adjacent one end of the motor to receive a blast of heated air from the fan, the fuel tank would become unduly heated without insulation. Thirdly, the sheets of fibre board 38 function to allow racking and straining of the wall portions 26, 27, 29 and 30 forming the sides of the well for the fuel tank, due to distortion of the body 10 as a whole, as the vehicle travels over rough terrain, without resultant straining and possible rupture of the fuel tank. The sheets of fibre board 38 are quite yieldable and function to absorb limited relative movement of the sides of the well without unduly stressing and bending the sides of the fuel tank. The sheets of fibre board also absorb shock and jars which would otherwise be transmitted to the fuel tank. The washer-like members 45 and 48 of yielding material function to allow relative movement between the webs of the channels 27 and 28 and the fuel tank 31 caused by the vehicle passing over rough terrain, and the fuel line from the tank to the adjacent motor is thus not thereby broken.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. In a vehicle, the combination of a vehicle body, means for propelling said vehicle and including a motor in said body, said body having a well therein comprising side walls and a bottom formed by certain structural portions of the body, a tank for motor fuel disposed in said well and having sheet metal sides and a bottom which lie adjacent and parallel to the walls and the bottom of the well, sheets of yielding material between said walls and the adjacent sides of said tank and between the bottom of the well and the bottom of the tank for cushioning the tank from shocks from the walls and bottom of the well or from racking of the opposite walls of the well with respect to each other and for supporting the tank with respect to the structural portions forming the well, fuel conveying means connected between said tank and said motor, and means which permits relative movement of the tank and fuel conveying means with respect to said structural portions.

2. In a vehicle, the combination of a vehicle body, means for propelling said vehicle and including a motor in said body, said body having structural portions having oppositely facing walls defining a well in the body which is adjacent one end of said motor, a motor fuel tank disposed in said well and having sheet metal sides which lie adjacent and parallel to the walls of the well, means for causing a draft of air over said motor toward its said one end for cooling the motor, yielding and heat insulating material between said walls and the adjacent sides of said tank for cushioning said tank from shocks from said walls, for wholly and completely supporting the tank with respect to the walls and for insulating the tank from heat carried by said draft of air from said motor, fuel-withdrawal means communicating with the interior of said fuel tank and said motor and yieldable means carried by said walls supporting said fuel-withdrawal means.

3. In a motor driven vehicle, in combination, a vehicle body, said body having a well therein forming spaced walls of certain structural portions of the body, a tank for fuel for the motor of said vehicle disposed in said well and having sides which lie adjacent to the walls of the well, yielding means between said walls and the adjacent sides of said tank for cushioning the tank from shocks of said walls, fuel conveying means connected between said tank and said motor, and means which permits relative movement between said fuel conveying means, said tank and said structural portions.

4. In a motor driven vehicle, in combination, a vehicle body, said body having a well therein forming spaced walls of certain structural portions of the body, a tank for fuel for the motor of said vehicle disposed in said well and having sides which lie adjacent to the walls of the well, yielding means between said walls and the adjacent sides of said tank for cushioning the tank from shocks of said walls and for supporting the tank with respect to said walls, fuel conveying means connected between said tank and said motor, and means which permits relative movement between said fuel conveying means, said tank and said structural portions.

BENJAMIN A. SWENNES.

REFERENCES CITED

The following references are of record in the file of this patent:

UNITED STATES PATENTS

| Number | Name | Date |
|---|---|---|
| 1,164,152 | Wolf | Dec. 14, 1915 |
| 1,761,053 | Rystedt | June 3, 1930 |
| 2,073,990 | Koch | Mar. 16, 1937 |
| 2,104,771 | Saunders | Jan. 11, 1938 |
| 2,116,666 | Carlson | May 10, 1938 |
| 2,259,319 | Norbom | Oct. 14, 1941 |
| 2,344,730 | Ramsey | Mar. 21, 1944 |
| 2,389,579 | Reynolds | Nov. 20, 1945 |

FOREIGN PATENTS

| Number | Country | Date |
|---|---|---|
| 206,823 | Great Britain | Feb. 28, 1924 |